United States Patent
Gulland et al.

(10) Patent No.: US 10,699,182 B2
(45) Date of Patent: Jun. 30, 2020

(54) DEPTH CONCATENATION USING A MATRIX COMPUTATION UNIT

(71) Applicant: Google LLC, Mountain View, CA (US)

(72) Inventors: William John Gulland, Novato, CA (US); Reginald Clifford Young, Palo Alto, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/531,774

(22) Filed: Aug. 5, 2019

(65) Prior Publication Data

US 2019/0354834 A1    Nov. 21, 2019

Related U.S. Application Data

(63) Continuation of application No. 15/624,629, filed on Jun. 15, 2017, which is a continuation of application
(Continued)

(51) Int. Cl.
G06N 3/04 (2006.01)
G06F 17/16 (2006.01)
G06N 3/063 (2006.01)

(52) U.S. Cl.
CPC .......... *G06N 3/04* (2013.01); *G06F 17/16* (2013.01); *G06N 3/063* (2013.01); *G06N 3/0635* (2013.01)

(58) Field of Classification Search
CPC ........ G06N 3/04; G06N 3/063; G06N 3/0635; G06F 17/16
See application file for complete search history.

(56) References Cited

U.S. PATENT DOCUMENTS 5,682,441 A    10/1997   Ligtenberg
6,137,914 A    10/2000   Ligtenberg
(Continued)

FOREIGN PATENT DOCUMENTS

CN    105844279    8/2016
TW    201034441    9/2010
(Continued)

OTHER PUBLICATIONS

Hutchinson et al., "Tensor Deep Stacking Networks," in 35.8 IEEE Transactions on Pattern Analysis and Machine Intelligence 1944-57 (2013). (Year: 2013).*

(Continued)

*Primary Examiner* — Kamran Afshar
*Assistant Examiner* — Ryan C Vaughn
(74) *Attorney, Agent, or Firm* — Fish & Richardson P.C.

(57) ABSTRACT

Methods, systems, and apparatus, including computer programs encoded on computer storage media, for depth concatenation using a matrix computation unit. One of the methods includes: receiving a request to process network inputs to a neural network using an integrated circuit, the neural network comprising a depth concatenation neural network layer; and generating instructions that, when executed by the integrated circuit, cause the integrated circuit to perform operations comprising: for each spatial location in a first input tensor to the depth concatenation layer and a second input tensor to the depth concatenation layer: multiplying, using the matrix computation unit, a second depth vector for the spatial location by a shift weight matrix for the depth concatenation layer to generate a shifted second depth vector; and adding the shifted second depth vector and a first input depth vector for the spatial location to generate a concatenated depth vector.

20 Claims, 8 Drawing Sheets

Related U.S. Application Data

No. 15/452,624, filed on Mar. 7, 2017, now Pat. No. 9,691,019.

(56) References Cited

U.S. PATENT DOCUMENTS

| | | | |
|---|---|---|---|
| 6,889,293 | B1 | 5/2005 | Kaxiras |
| 9,384,168 | B2 | 7/2016 | Mortensen |
| 9,411,468 | B2 | 8/2016 | Westerman |
| 9,489,176 | B2 * | 11/2016 | Haugen .................. G06F 17/16 |
| 9,495,776 | B2 | 11/2016 | Matsumoto |
| 9,524,461 | B1 | 12/2016 | Huynh |
| 9,552,047 | B2 | 1/2017 | Vorbach |
| 9,614,699 | B2 | 4/2017 | Iqbal |
| 9,691,019 | B1 | 6/2017 | Gulland et al. |
| 2014/0067735 | A1 * | 3/2014 | Yu ............................ G06N 3/02 706/20 |
| 2014/0181171 | A1 * | 6/2014 | Dourbal .................. G06F 17/16 708/607 |
| 2016/0342890 | A1 | 11/2016 | Young |
| 2016/0342891 | A1 | 11/2016 | Ross et al. |
| 2016/0342892 | A1 * | 11/2016 | Ross .................. G06F 15/8046 |
| 2017/0103313 | A1 | 4/2017 | Ross |
| 2017/0103317 | A1 | 4/2017 | Clifford |
| 2017/0140263 | A1 * | 5/2017 | Kaiser ...................... G06F 17/16 |
| 2017/0200094 | A1 * | 7/2017 | Bruestle ................. G06N 20/00 |
| 2017/0220352 | A1 * | 8/2017 | Woo ...................... G06F 9/3001 |
| 2018/0018554 | A1 * | 1/2018 | Young ..................... G06N 3/04 |
| 2018/0260683 | A1 | 9/2018 | Gulland et al. |

FOREIGN PATENT DOCUMENTS

| | | |
|---|---|---|
| WO | 2016/033506 | 3/2016 |
| WO | 2016/186810 | 11/2016 |
| WO | 2016/186813 | 11/2016 |
| WO | 2016/186823 | 11/2016 |

OTHER PUBLICATIONS

A fully analog memristor-based neural network with on line gradient training Eyal Rosenthal; Sergey Greshnikov; Daniel Soudry; Shahar Kvatinsky 2016 IEEE International Symposium on Circuits and Systems (ISCAS) Year: 2016 pp. 1394-1397, DOI: 10.1109/ISCAS.2016.752751 O IEEE Conference Publications.

Analysis and Design of a Passive Switched-Capacitor Matrix Multiplier for Approximate Computing Edward H. Lee; S. Simon Wong IEEE Journal of Solid-State Circuits Year: 2017, vol. 52, Issue: 1 pp. 261-271, DOI: 10.1109/JSSC.2016.2599536 IEEE Journals & Magazines.

Anonymous. "How does the DepthcConcat operation in 'Going deeper with convolutions' work?", Jul. 20, 2016, [retrieved on Jun. 8, 2018] Retrieved from Internet: URL<https://stats.stackexchange.com/questions/184823/how-does-the-depthconcat-operation-in-going-deeper-with-convolutions-work> 3 pages.

Digital Circuit Network Evolution Based on the Virtual Reconfigurable Platform Lou Jianan; Zhang Zhiwu; Cui Xinfeng; Zou Liming 2012 Fourth International Conference on Computational Intelligence and Communication Networks Year: 2012 pp. 540-544, DOI: 10.1109/CICN.2012.99 IEEE Conference Publications.

Extended European Search Report issued in European Application No. 18160441.4, dated Jul. 17, 2018, 12 pages.

GB Combined Search and Examination Report issued in British Application No. GB1803653.3, dated Sep. 21, 2018, 9 pages.

International Search Report and Written Opinion issued in International Application No. PCT/US2018/021221, dated Jun. 18, 2018, 19 pages.

Sak et al., "Long Short-term Memory Recurrent Neural Network Architectures for Large Scale Acoustic Modeling," (2014) [online] (retrieved from http://193.6.4.39/~czap/letoltes/is14/is2014/pdf/author/is141304.pdf, 5 pages.

Szegedy et al., "Inception-v4, Inception-ResNet and the Impact of Residual Connections on Learning," (Feb. 23, 2016) [online] (retrieved from http://static.googleusercontent.com/media/research.google.com/en//pubs/archive/45169.pdf), 12 pages.

Vector-Matrix Multiply and Winner-Take-All as an Analog Classifier Shubha Ramakrishnan; Jennifer Hasler IEEE Transactions on Very Large Scale Integration (VLSI) Systems Year: 2014, vol. 22, Issue: 2; pp. 353-361, DOI: 10.1109/TVLS1.2013.2245351 IEEE Journals & Magazines.

TW Office Action in Taiwan Application No. 107107502 dated May 10, 2019, 6 pages (with English translation).

PCT International Preliminary Report on Patentability and Written Opinion in International Application No. PCT/US2018/021221, dated Sep. 10, 2019, 12 pages.

GB Office Action in Great Britain Application No. GB1803653.3, dated Apr. 20, 2020, 5 pages.

* cited by examiner

DEPTH CONCATENATION USING A MATRIX COMPUTATION UNIT

CROSS-REFERENCE TO RELATED APPLICATION

This is a continuation of U.S. application Ser. No. 15/624,629, filed Jun. 15, 2017, which is a continuation of U.S. application Ser. No. 15/452,624, filed on Mar. 7, 2017, the disclosure of which is considered part of and is incorporated by reference in the disclosure of this application.

BACKGROUND

This specification relates to performing neural network computations in hardware.

Neural networks are machine learning models that employ one or more layers of models to generate an output, e.g., a classification, for a received input. Some neural networks include one or more hidden layers in addition to an output layer. The output of each hidden layer is used as input to one or more other layers in the network, i.e., one or more other hidden layers or the output layer of the network. Each layer of the network generates an output from a received input in accordance with current values of a respective set of parameters.

Some neural networks include a depth concatenation layer that receives as input two or more tensors, i.e., multi-dimensional matrices, that are the outputs of other layers in the neural network and concatenates the input tensors along the depth dimension. In particular, each input tensor has two spatial dimensions x and y and a depth dimension z. By concatenating two input tensors, one having dimensions $x_1$ by $y_1$ by $z_1$ and the other having dimensions $x_1$ by $y_1$ by $z_2$, along the depth dimension z, the depth concatenation layer generates an output tensor that has dimensions $x_1$ by $y_1$ by $(z_1+z_2)$. The output of the depth concatenation layer can then be provided as input to one or more other layers in the neural network or used as the output of the neural network.

SUMMARY

This specification describes technologies for performing a concatenation of two tensors along the depth dimension using a matrix computation unit. These technologies generally involve receiving a request to process network inputs to a neural network that includes a depth concatenation layer on an integrated circuit for performing neural network computations. The integrated circuit includes a matrix computation unit that performs vector—matrix multiplications in hardware, but cannot directly perform a depth concatenation operation in hardware. Instead, a neural network processing system generates instructions that, when executed by the integrated circuit, cause the integrated circuit to perform operations in hardware that generate an output that satisfies the specification of the depth concatenation layer using the matrix computation unit.

The subject matter described in this specification can be implemented in particular embodiments so as to realize one or more of the following advantages. An output that satisfies the specification of a depth concatenation layer can be generated in hardware by a special-purpose integrated circuit even though the integrated circuit cannot directly perform a depth concatenation operation in hardware. By generating the satisfactory output in hardware on the integrated circuit, the processing of an inference for a neural network that includes a depth concatenation layer can be performed without passing data back to the host, i.e., without performing part of the computation off-chip, even though the integrated circuit does not directly support the depth concatenation operation. This allows the processing of an inference for such a neural network to be performed efficiently without modifying the hardware architecture of the integrated circuit. In particular, the system can efficiently process a neural network inference without adding depth-concatenating hardware to the special-purpose circuit or adding shift support to the vector unit of the special-purpose circuit. That is, processing delays due to needing to perform part of the computation off-chip, in software, or both are avoided.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
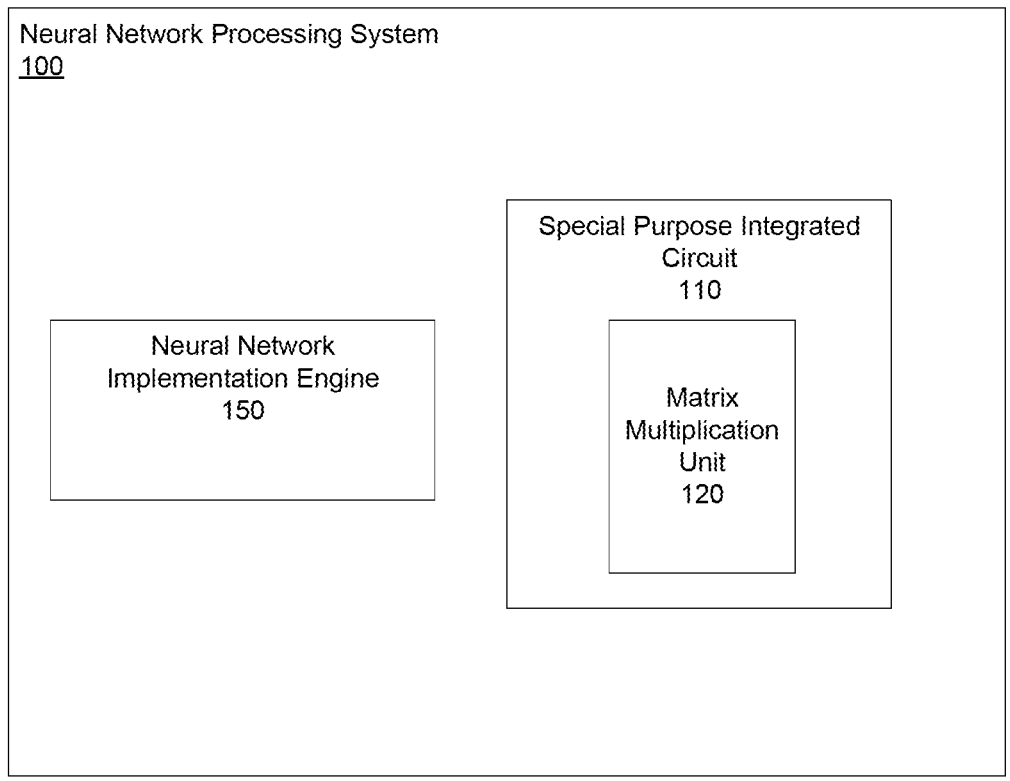
FIG. 1 shows an example neural network processing system.

FIG. 1 shows an example neural network processing system 100.

The neural network processing system 100 is an example of a system implemented as one or more computers in one or more locations in which the systems, components, and techniques described below can be implemented.

The neural network processing system 100 is a system that performs neural network computations using a special-purpose integrated circuit 110. The integrated circuit 110 is a special-purpose integrated circuit for performing neural network computations and includes a matrix computation unit 120 that performs vector—matrix multiplications in hardware. An example special-purpose integrated circuit is described in more detail below with reference to FIG. 2.

In particular, the neural network processing system 100 receives requests to implement neural networks on the special-purpose integrated circuit 110, implements the neural networks on the special-purpose integrated circuit 110, and, once a given neural network is implemented, processes inputs to the neural network using the special-purpose integrated circuit 110 to generate neural network inferences.

That is, the neural network processing system 100 can receive a request that specifies a neural network architecture for a neural network that is to be used to process inputs. The neural network architecture defines the number and configuration of layers in the neural network and values of the parameters for each of the layers that has parameters.

To implement a neural network on the special-purpose integrated circuit 110, the neural network processing system 100 includes a neural network implementation engine 150 that is implemented as one or more computer programs on one or more computers in one or more physical locations.

The neural network implementation engine 150 generates instructions that, when executed by the integrated circuit 110, cause the integrated circuit 110 to perform the operations specified by the neural network to generate a neural network output from a received neural network input.

Once the instructions have been generated by the neural network implementation engine 150 and provided to the integrated circuit 110, the neural network processing system 100 can receive neural network inputs and can process the neural network inputs using the neural network by causing the integrated circuit 110 to execute the generated instructions.

Some neural networks, however, include one or more incompatible neural network layers. The term incompatible neural network layer as used in this specification refers to a neural network layer that specifies an operation that cannot be directly performed in hardware by the integrated circuit 110. To implement these neural networks on the integrated circuit, the neural network implementation engine 150 generates instructions that, when executed by the integrated circuit 110, cause the integrated circuit 110 to generate an output for the incompatible neural network layer by performing operations in hardware that are different from those specified by the neural network layer but that result in a layer output being generated that satisfies the specification of the incompatible neural network layer, i.e., a layer output that is the same as an output that would have been generated by directly performing the operations specified by the layer.

In particular, some neural networks include a depth concatenation layer. A depth concatenation layer is a layer that receives as input two or more tensors, i.e., two or more multi-dimensional matrices, that are the outputs of other layers in the neural network and concatenates the input tensors along the depth dimension. In particular, each input tensor has two spatial dimensions x and y and a depth dimension z. By concatenating two input tensors, one having dimensions $x_1$ by $y_1$ by $z_1$ and the other having dimensions $x_1$ by $y_1$ by $z_2$, along the depth dimension z, the depth concatenation layer generates an output tensor that has dimensions $x_1$ by $y_1$ by $(z_1+z_2)$. The output tensor can then be used as input by another layer of the neural network.

Examples of neural networks that may be implemented on integrated circuit 110 and that include one or more depth concatenation layers are the image recognition neural networks described in Christian Szegedy, Sergey Ioffe, Vincent Vanhoucke, "Inception-v4, Inception-ResNet and the Impact of Residual Connections on Learning," available at www.static.googleusercontent.com.

Other examples of neural networks that include depth concatenation layers are long-short term memory (LSTM) neural networks, like the ones described in Hasim Sak, Andrew Senior, Francoise Beaufays, Long Short-Term Memory Recurrent Neural Network Architectures for Large Scale Acoustic Modeling.

Because the main hardware unit that performs matrix operations on the integrated circuit 110 is the matrix computation unit 120, the integrated circuit cannot directly perform a depth concatenation operation in hardware.

To implement a neural network that includes a depth concatenation layer on the integrated circuit 110, the neural network implementation engine 150 generates instructions that, when executed by the integrated circuit 110 during processing of a neural network input by the neural network, cause the integrated circuit 110 to perform other operations in hardware to generate an output tensor that satisfies the specification of the depth concatenation neural network layer using the matrix computation unit 120. These instructions and other operations are described in more detail below with reference to FIGS. 3-8.

While this specification describes the circuit used to perform neural network as being a special-purpose integrated circuit, the techniques described in this specification can be performed on any circuit, e.g., an FPGA, an ASIC, a GPU, and so on, that is augmented with a matrix computation unit.

Figure 2:
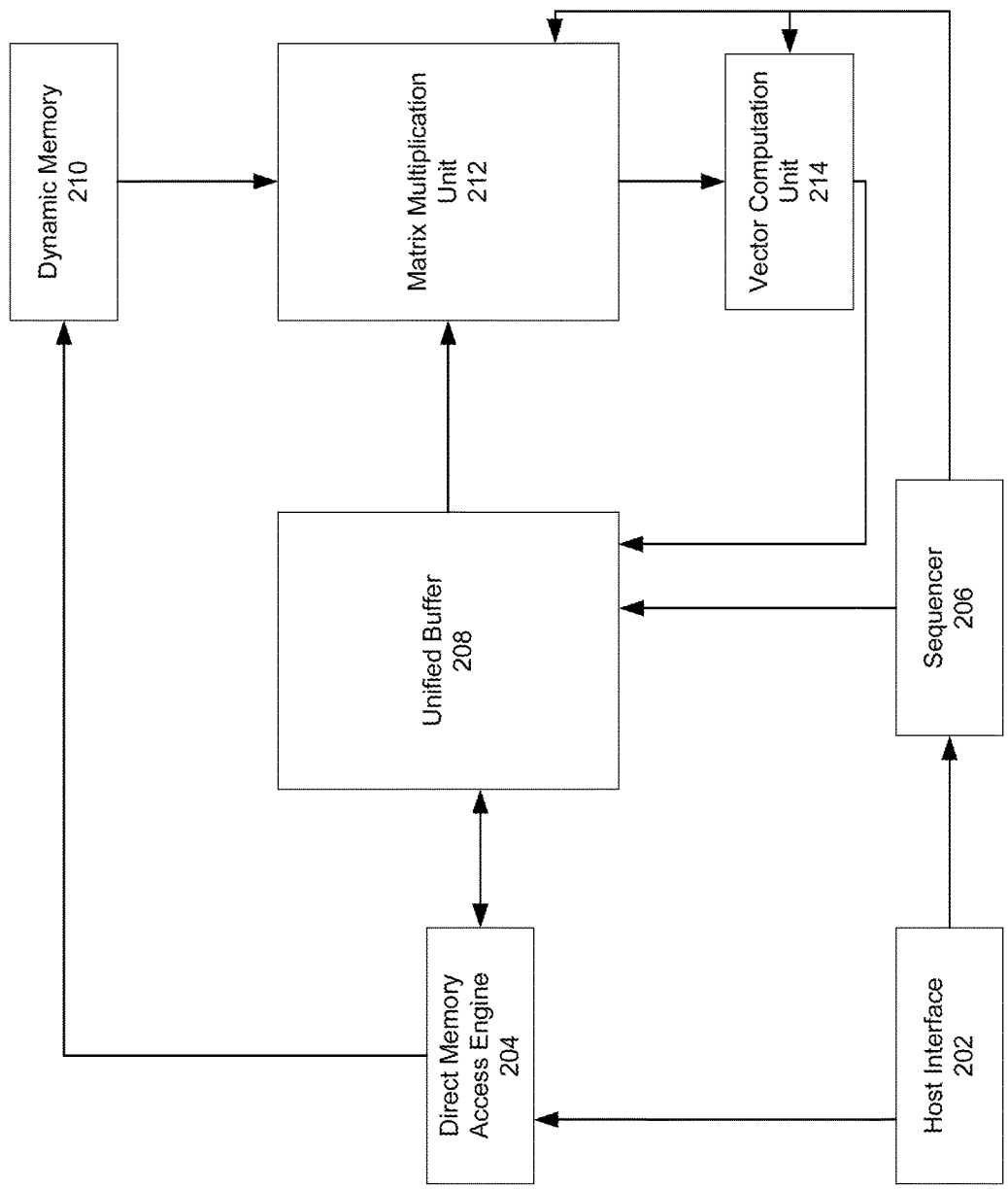
FIG. 2 shows an example special-purpose integrated circuit.

FIG. 2 shows an example special-purpose integrated circuit 200 for performing neural network computations.

The integrated circuit 200 includes a host interface 202. The host interface 202 can receive instructions that include parameters for a neural network computation. The parameters can include at least one or more of the following: how many layers should be processed, data identifying corresponding sets of weight inputs for each layer, an initial set of activation inputs, i.e., the input to the neural network from which the inference is to be computed, corresponding input and output sizes of each layer, and so on. When the neural network being processed includes a depth concatenation layer, the parameters include one or more shift weight matrices for the depth concatenation layer and one or more modified identity weight matrices for the depth concatenation layer. Shift weight matrices and modified identity weight matrices are described in more detail below with reference to FIGS. 3-5.

The host interface 202 can send the instructions to a sequencer 206, which converts the instructions into low level control signals that control the circuit to perform the neural network computations. In some implementations, the control signals regulate dataflow in the circuit 200, e.g., how the sets of weight inputs and the sets of activation inputs flow through the circuit 200. The sequencer 206 can send the control signals to a unified buffer 208, a matrix computation unit 212, and a vector computation unit 214. In some implementations, the sequencer 206 also sends control signals to a direct memory access engine 204 and a dynamic memory 210.

The host interface 202 can send the sets of weight inputs and the initial set of activation inputs to the direct memory access engine 204. The direct memory access engine 204 can store the sets of activation inputs at the unified buffer 208.

In some implementations, the direct memory access engine 204 stores the sets of weights to dynamic memory 210, which can be a memory unit. In some implementations, the dynamic memory is located off of the circuit. When the neural network being processed includes a depth concatenation layer, the direct memory access engine 204 stores the one or more shift weight matrices for the depth concatenation layer and, in some implementations, the modified identity weight matrix for the depth concatenation layer in the dynamic memory 210.

The unified buffer 208 is a memory buffer. It can be used to store the set of activation inputs from the direct memory access engine 204 and outputs of the vector computation unit 214. The direct memory access engine 204 can also read the outputs of the vector computation unit 214 from the unified buffer 208.

When instructed to do so, the dynamic memory 210 and the unified buffer 208 can send the sets of weight inputs and the sets of activation inputs, respectively, to the matrix computation unit 212.

Generally, the matrix computation unit 212 can be any unit that performs multiplication of a vector by a matrix in hardware. In some implementations, the matrix computation unit 212 is a two-dimensional systolic array. The matrix computation unit 212 can also be a one-dimensional systolic array or other circuitry that can perform mathematical operations, e.g., multiplication and addition.

The matrix computation unit 212 can process the weight inputs and the activation inputs and provide a vector of outputs to the vector computation unit 214. In some cases, the matrix computation unit 212 sends the vector of outputs to the unified buffer 208, which sends the vector of outputs to the vector computation unit 214 or back to the matrix computation unit 212 if the current neural network layer does not apply an activation function. For example, once the depth concatenated output of a depth concatenation layer has been generated, the matrix computation unit 212 can send the output to the unified buffer 208 rather than to the vector computation unit 214 because the depth concatenation layer does not apply an activation function. In some other cases, even though the depth concatenation layer does not apply an activation function, the matrix computation unit 212 sends the output to the vector computation unit 214, which applies an identity activation function to the output, i.e., does not modify the output, before routing the output back to the unified buffer 208.

The vector computation unit 214 can process the vector of outputs and store a vector of processed outputs to the unified buffer 208. For example, the vector computation unit 214 can apply a non-linear function to outputs of the matrix computation unit, e.g., a vector of accumulated values, to generate activated values. In some implementations, the vector computation unit 214 generates normalized values, pooled values, or both. The vector of processed outputs can be used as activation inputs to the matrix computation unit 212, e.g., for use in a subsequent layer in the neural network.

The integrated circuit 200 and, in particular, an example implementation of the matrix computation unit 212 that allows the matrix computation unit 212 to perform vector-matrix multiplication in hardware, is described in more detail in U.S. patent application Ser. No. 14/844,524, titled "Neural Network Processor," filed on Sep. 3, 2015, the entire contents of which are hereby incorporated by reference herein in their entirety.

Figure 3:
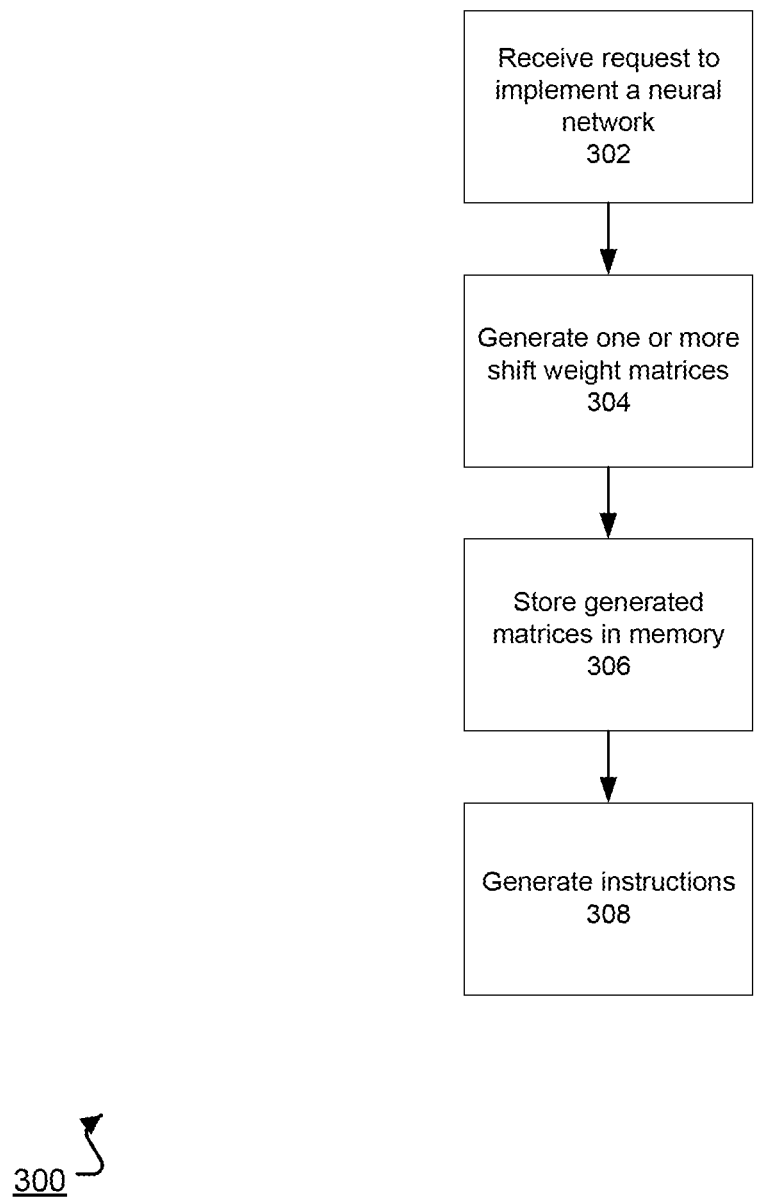
FIG. 3 is a flowchart of an example process for generating instructions that cause a special-purpose integrated circuit to generate an output tensor for a depth concatenation layer.

FIG. 3 is a flowchart of an example process 300 for generating instructions that cause a special-purpose integrated circuit to generate an output tensor for a depth concatenation layer. For convenience, the process 300 will be described as being performed by a system of one or more computers, located in one or more locations, and programmed appropriately in accordance with this specification. For example, a neural network processing system, e.g., the neural network processing system 100 of FIG. 1, appropriately programmed, can perform the process 300.

The system receives a request to implement a neural network on a special-purpose integrated circuit, i.e., to process inputs to the neural network using the special-purpose integrated circuit to generate outputs (step 302).

In particular, the neural network to be implemented on the integrated circuit includes a depth concatenation layer that specifies a concatenation of two tensors along the depth dimension. For example, the depth concatenation layer may specify a concatenation along the depth dimension of a first input tensor having dimensions $x_1$ by $y_1$ by $z_1$ and a second input tensor having dimensions $x_1$ by $y_1$ by $z_2$ to generate an output tensor that has dimensions $x_1$ by $y_1$ by $(z_1+z_2)$.

The system generates one or more shift weight matrices for use in performing the concatenation specified by the depth concatenation layer (step 304).

A shift matrix is a matrix that, when multiplied with an input vector, generates an output vector in which the position of one or more of the entries of the input vector is shifted while one or more other entries of the input vector have been replaced by zeroes. Generally, the shift matrices described in this specification are matrices for use as the matrices on the right side of a matrix multiplication operation to move values of input vectors to desired positions in an output vector. However, in some other implementations, differently constructed shift matrices can be used as the matrices on the left side of the matrix multiplication operation to achieve the same results.

In particular, because the matrix computation unit of the integrated circuit performs matrix multiplication in hardware, the matrix computation unit has a maximum vector length (max). The maximum vector length is the maximum length of a vector that can be multiplied by a matrix by the matrix computation unit in one pass, i.e., without dividing the vector into multiple inputs to the matrix computation unit. For example, if the matrix computation unit is a one-dimensional or two-dimensional systolic array, the maximum vector length is equal to the number of columns in the unit or to the number of rows in the unit.

For tensors having a depth of less than or equal to max, the system stores the tensor as a collection of respective depth vectors having length max for every spatial location in the input tensor.

A spatial location is a pair of (x,y) spatial coordinates, i.e., so that all entries at all depth dimensions that share the same (x,y) spatial coordinates in a tensor are at the same spatial location. The depth vector for a given spatial location is a vector that includes all of the entries in the tensor that are at the given spatial location. If the tensor has a depth z of less than max, the last max−z entries of each depth vector are padded with zeroes or garbage values, i.e., values that may be used for other purposes but are not relevant to and should not influence the depth concatenation operation.

For tensors having a depth of more than max, the system represents each depth vector as multiple max length vectors. Each of these max length vectors that makes up part of a depth vector will be referred to in this specification as a chunk vector.

For a given spatial location in a tensor having a depth z, the depth vector for the location is represented as ceiling(z/max) chunk vectors, wherein ceiling(x) is the least integer greater than or equal to x. The first floor(z/max) chunk vectors, with floor(x) being the greatest integer less than or equal to x, each store values from the corresponding dimensions in the depth vector for the spatial location, i.e., with the first chunk vector storing the entries at the spatial location in the first max depth dimensions, the second chunk vector storing the entries at the spatial location in the second max depth dimensions, and so on. The first floor(z/max)*max entries of the last chunk vector are the entries at the last floor(z/max)*max depth dimensions and any remaining entries are padded with zeroes or garbage values.

In some cases, the number of depth dimensions $(z_1+z_2)$ of the output tensor will not exceed the maximum vector length and the depth vectors of the output tensors are single chunk vectors. In these cases, the system generates a single shift weight matrix for the depth concatenation operation.

If the number of depth dimensions of the output tensor does exceed the maximum vector length and the depth vectors are represented by multiple chunk vectors, the system may need to generate more than one shift weight matrix for the depth concatenation operation.

The system also generates one or more modified identity weight matrices for the depth concatenation layer. A modified identity weight matrix is a matrix that has ones along a portion of the main diagonal and zeros for all other entries.

In general, a shift matrix that shifts entries that start at the j-th position of an input vector to starting at the i-th position of the input vector is a max by max matrix that is all zeros other than a diagonal row of ones starting at the j-th value of the i-th column of the matrix.

Shift matrices and modified identity weight matrices will be described in more detail below with reference to FIGS. 4-8.

The system stores the one or more shift weight matrices and the one or more modified identity weight matrices for the depth concatenation layer in a memory that is accessible to the special-purpose integrated circuit (step 306). For example, the system can send the generated matrix or matrices to a host interface of the special-purpose integrated circuit for storage in a dynamic memory accessible to the circuit.

The system generates instructions that, when executed by the integrated circuit during processing of a neural network input by the neural network, cause the integrated circuit to generate an output tensor that satisfies the specification of the depth concatenation neural network layer using the generated matrices (step 308). In particular, the system generates instructions that, when executed, cause the integrated circuit to perform the processes 400, 500, or 600 described below with reference to FIGS. 4-6, respectively.

Figure 4:
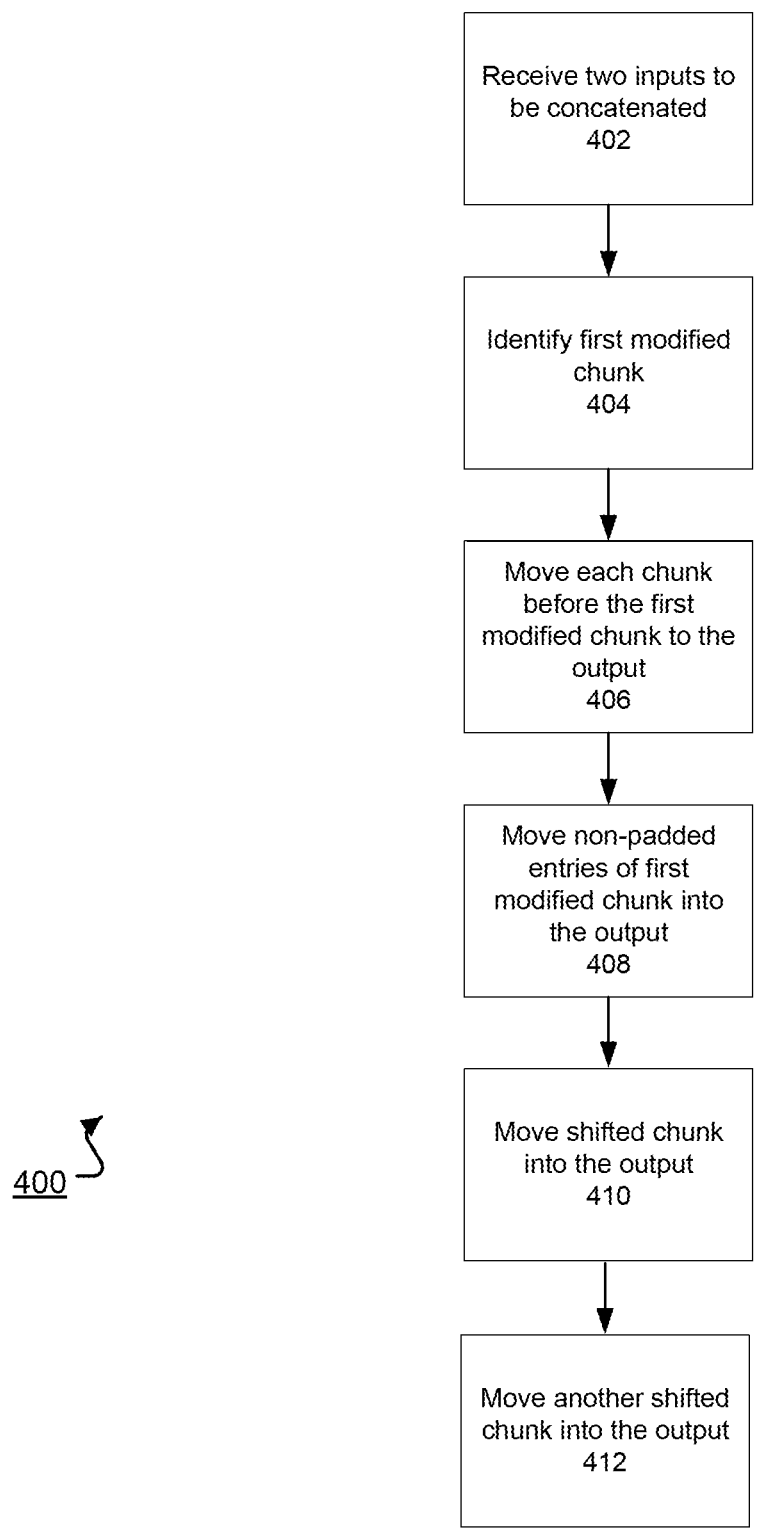
FIG. 4 is a flowchart of an example process for concatenating two tensors along the depth dimension.

FIG. 4 is a flowchart of another example process 400 for concatenating two input vectors. The process 400 is performed in hardware by a special-purpose integrated circuit that includes a hardware matrix computation unit, e.g., the special-purpose integrated circuit 110 of FIG. 1.

The integrated circuit receives two inputs to be concatenated (step 402). Each input is a depth vector at a given spatial location from a respective tensor to be depth concatenated and each input is made up of one or more max-sized chunk vectors. That is, one input is the depth vector at the spatial location from one input tensor and the other input is the depth vector at the spatial location from the other input tensor.

In some cases, i.e., when the number of depth dimensions in either or both tensors is not a multiple of max, the last chunk vector for each spatial location in either or both tensors includes padded values, i.e., zeros or garbage values that have been added to the chunk vector but are not part of the input tensor. The entries in a chunk vector other than the padded entries will be referred to as non-padded entries.

The integrated circuit identifies, e.g., based on a control signal, the chunk vector in the first or second input that is the first chunk vector that needs to be modified as part of the depth concatenation (referred to as "the first modified chunk vector") (step 404). The first chunk vector that needs to be modified is the first chunk vector that includes one or more padded entries.

For each chunk vector before the first chunk vector that needs to be modified, the integrated circuit moves the chunk vector to the output of the matrix computation unit unmodified and then moves the chunk vectors out of the output as output chunk vectors of the concatenation operation (step 406). Moving vectors to the output of the matrix computation unit will be described below with reference to FIGS. 5-8.

The integrated circuit moves the non-padded entries of the first chunk vector that needs to be modified into the output of the matrix computation unit (step 408).

That is, the integrated circuit multiplies the first modified chunk vector by a partial identity matrix to move a chunk vector that has the non-padded entries of the first chunk vector and zeroes for the remaining entries to the output of the matrix computation unit. Multiplying vectors by partial identity matrices will be described below with reference to FIGS. 5-8.

The integrated circuit moves, using an appropriate shift matrix, a shifted chunk vector into the output to sum the shifted chunk vector and the chunk vector currently in the output and then moves the sum of the chunk vectors out of the output as an output chunk vector of the concatenation operation (step 410).

For the first iteration of step 410 that is performed during a depth concatenation, the chunk vector currently in the output is the first chunk vector that needs to be modified.

The shifted chunk vector is a chunk vector that has zeroes as its first (max−n) entries and the first n entries of the next chunk vector as its remaining entries, where n is the number of padded entries in the chunk vector that is currently in the output and the next chunk vector is the next chunk vector to be operated on when the chunk vectors in the inputs are arranged in sequence starting from the first chunk vector in the first input and ending with the last chunk vector in the second input.

Generating shifted chunk vectors using shift matrices and summing vectors is described in more detail below with reference to FIGS. 5-8.

The integrated circuit moves, using another appropriate shift matrix, another shifted chunk vector to the output (step 412).

The other shifted chunk vector is a chunk vector that has any additional non-padded entries in the next chunk vector as its first entries and padded entries as its remaining entries.

The integrated circuit continues performing steps 410 and 412 until there are no remaining next chunk vectors, i.e., until after all the input chunk vectors have been operated on.

The system can perform the process 400 for each spatial location in the input tensors to depth concatenate the two input tensors.

Figure 5:
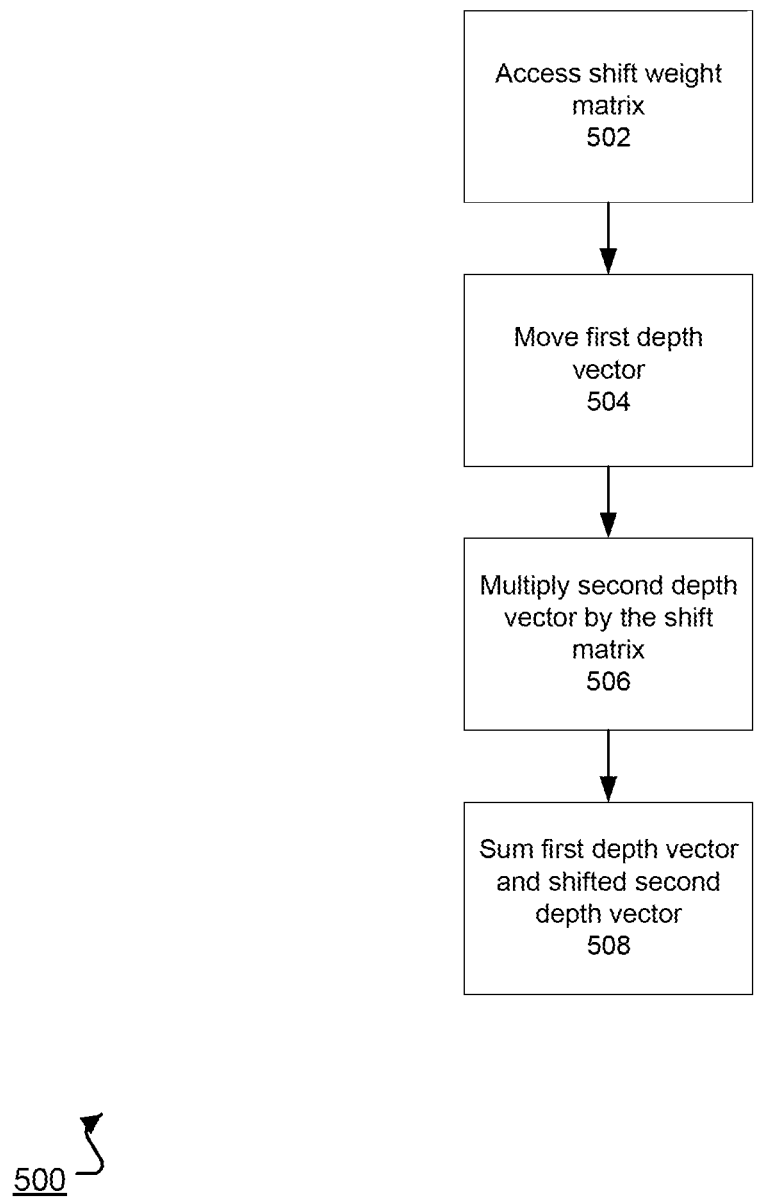
FIG. 5 is a flowchart of another example process for concatenating two tensors along the depth dimension.

FIG. 5 is a flowchart of another example process 500 for concatenating two tensors along the depth dimension. The process 500 is performed in hardware by a special-purpose integrated circuit that includes a hardware matrix computation unit, e.g., the special-purpose integrated circuit 110 of FIG. 1.

In particular, the process 500 is an example of a process to be performed to concatenate two tensors when the concatenated tensor has a number of depth dimensions that does not exceed the maximum vector length of the matrix computation unit, i.e., each output depth vector can be stored as a single chunk.

The integrated circuit accesses a shift weight matrix for the depth concatenation (step 502) from a memory accessible to the integrated circuit, e.g., from the dynamic memory 210 of FIG. 2. In some implementations, the integrated circuit also accesses a modified identity weight matrix for the depth concatenation from the memory.

The integrated circuit moves a first depth vector for a given spatial location in the first input tensor to the output of the matrix computation unit (step 504). The first depth vector for the given spatial location is a vector that includes all of the entries in the first input tensor that are at the given spatial location and has padded values as any remaining values of the first depth vector.

For example, the integrated circuit can move each entry of the first depth vector to a respective sum-in register of a set of registers that stores the outputs of multiplications performed by the matrix computation unit.

To move the first depth vector to the output, the integrated circuit can multiply the first depth vector by a modified identity weight matrix for the depth concatenation using the matrix computation unit, resulting in the first depth vector being stored in the output of the matrix computation unit. The modified identity weight matrix is a max×max matrix that is all zeroes other than having ones in the first $z_1$ entries of the main diagonal.

The integrated circuit multiplies a second depth vector for the given spatial location in the second input tensor by the shift weight matrix for the depth concatenation (step 506) to generate a shifted second depth vector. The second depth vector for the given spatial location is a vector that includes all of the entries in the second input tensor that are at the given spatial location and has padded values as any remaining values of the second depth vector.

By virtue of the structure of the shift weight matrix, the resulting shifted second depth vector is a vector that has max entries, with the first $z_1$ entries being zero, the next $z_2$ entries being the entries of the second depth vector for the spatial location, and any remaining entries being zero.

The integrated circuit sums the first depth vector and the shifted second depth vector to generate a concatenated depth vector (step 508). For example, the system can add each entry of the second depth vector to the corresponding entry of the first depth vector by moving the entry of the second depth vector into the sum-in register that stores the corresponding entry of the first depth vector.

The integrated circuit can perform steps 504-508 for each spatial location in the input tensors to generate the output of the depth concatenation layer.

Figure 6:
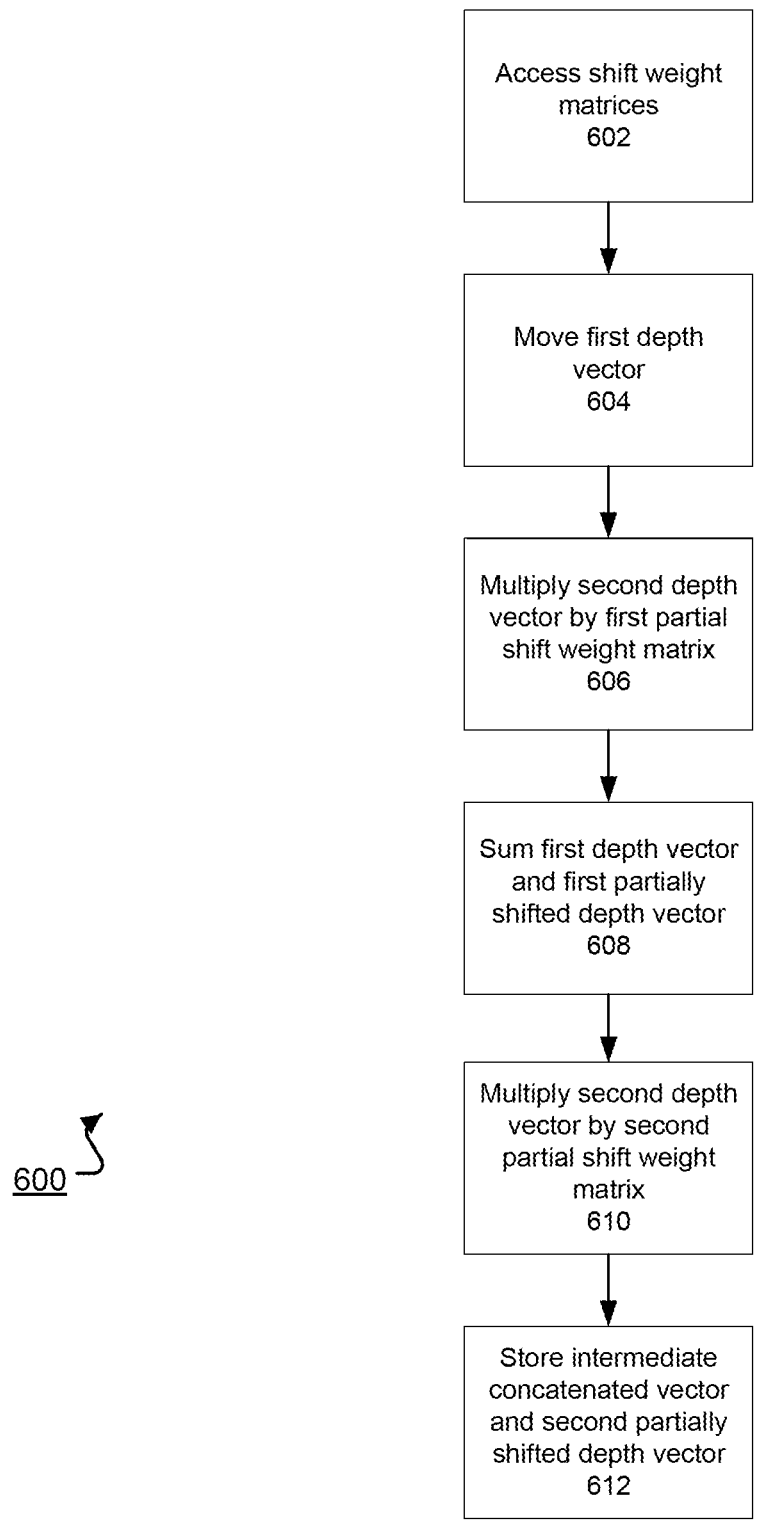
FIG. 6 is a flowchart of yet another example process for concatenating two tensors along the depth dimension.

FIG. 6 is a flowchart of another example process 600 for concatenating two tensors along the depth dimension. The process 600 is performed in hardware by a special-purpose integrated circuit that includes a hardware matrix computation unit, e.g., the special-purpose integrated circuit 110 of FIG. 1.

In particular, the process 600 is an example of a process to be performed to concatenate two tensors when the first tensor has a number of depth dimensions that is less than the maximum vector length of the matrix computation unit but the concatenated tensor has a number of depth dimensions that exceeds the maximum vector length. That is, the first depth vector is the first chunk vector that needs to be modified in the process 400 of FIG. 4.

The integrated circuit accesses shift weight matrices for the depth concatenation (step 602) from a memory accessible to the integrated circuit, e.g., from the unified buffer 208 of FIG. 2. In some implementations, the integrated circuit also accesses a modified identity weight matrix for the depth concatenation from the memory.

The integrated circuit moves a first depth vector for a given spatial location in the first input tensor to the output of the matrix computation unit (step 604). In this example, the first depth vector is a vector that has max entries, with the first $z_1$ entries being the entries of the first depth vector for the spatial location and the remaining entries being zeros.

For example, the integrated circuit can move each entry of the first depth vector to a respective sum-in register of a set of registers that stores the outputs of multiplications performed by the matrix computation unit by multiplying the first depth vector by a modified identity weight matrix that has dimensions (max) by (max) and that includes zeros along the main diagonal until the $z_1$-th entry of the $z_1$-th column inclusive.

The integrated circuit multiplies the first chunk vector of the second depth vector for the given spatial location in the second input tensor by the first shift matrix for the depth concatenation (step 606) to generate a first partially shifted chunk.

By virtue of the structure of the first shift matrix, the first partially shifted depth vector for a given spatial location is a vector that has (max) entries, with the first $z_1$ entries being zero and the next (max−$z_1$) entries being the first (max−$z_1$) entries of the first chunk vector of the second depth vector for the spatial location.

The integrated circuit sums the first depth vector and the first partially shifted depth vector to generate an intermediate concatenated depth vector (step 608). For example, the system can add each entry of the first partially shifted depth vector to the corresponding entry of the first depth vector by moving the entry of the first partially shifted depth vector into the sum-in register that stores the corresponding entry of the first depth vector. The intermediate concatenated depth vector is a vector that has (max) entries, with the first $z_1$ entries being the entries of the first depth vector and the next (max−$z_1$) entries being the first (max−$z_1$) entries of the second depth vector for the spatial location.

The integrated circuit multiplies the depth vector for the given spatial location in the second input tensor by the second shift matrix for the depth concatenation (step 610) to generate a second partially shifted depth vector.

By virtue of the structure of the second shift matrix, the second partially shifted depth vector for a given spatial location is a vector that has (max) entries, with the first ($z_1+z_2$−max) entries being the last ($z_1+z_2$−max) of the second depth vector for the spatial location and the remaining entries being zero or garbage values.

The integrated circuit stores the second partially shifted depth vector and the intermediate concatenated depth vector as a representation of a concatenated depth vector for the spatial location (step 612). For example, the integrated circuit can store the second partially shifted depth vector and the intermediate concatenated depth vector in predetermined locations in the unified buffer that are identified in the instructions as locations where the two vectors that represent the concatenated depth vector for the spatial location are to be stored.

The integrated circuit can perform the process 600 for each spatial location in the input tensors to generate the output of the depth concatenation layer.

Figure 7:
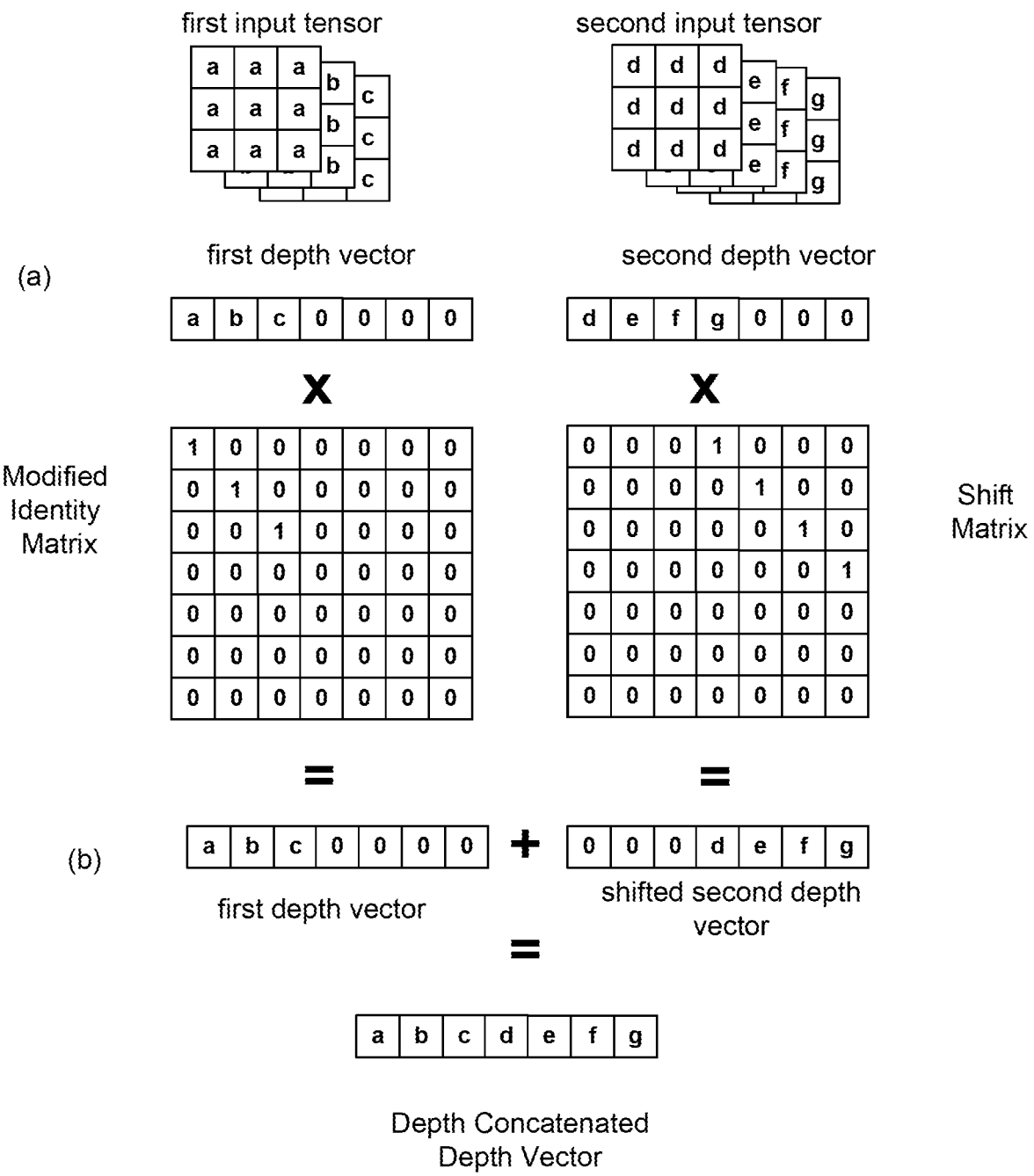
FIG. 7 shows an example of a depth concatenation computation that requires a single shift matrix.

FIG. 7 shows an example of a depth concatenation computation 700 that requires a single shift matrix.

In the simplified example of FIG. 7, a first input tensor that has dimensions 3×3×3 is to be depth concatenated with a second input tensor that has dimensions 3×3×4 to generate a 3×3×7 output tensor and the maximum vector length that can be processed in one pass by the matrix computation unit is eight, so that the depth of the concatenated output tensor is less than the maximum vector length.

In part (a) of the computation, the integrated circuit operates on a first depth vector from the first tensor and a corresponding second depth vector from the second tensor. In particular, the first depth vector has as its first 3 entries the 3 entries at a given spatial location in the first input tensor and zeroes as its remaining entries, while the second depth vector has as its first 4 entries the 4 entries at the given spatial location in the second input tensor and zeroes as its remaining entries.

In the example of FIG. 7, the first depth vector and the second depth vector have been padded with zeroes, but in other examples one or both of the depth vectors can instead be padded with garbage data.

To perform part (a) of the computation, the integrated circuit multiplies the first depth vector by a modified identity weight matrix using the matrix computation unit to generate another instance of the first depth vector in the output of the matrix computation unit, i.e., to move the first depth vector to the output. In the example of FIG. 7, the modified identity matrix has 1 s along the first three entries of the main diagonal and zeroes for the last four entries of the main diagonal. However, because the depth vectors are padded with zeros rather than garbage values, the modified identity weight matrix may instead have other values for the last four entries of the main diagonal and for other entries that are only multiplied by the padded entries of the first depth vector during the multiplication.

The integrated circuit then multiplies the second depth vector by a shift matrix to generate a shifted depth vector. The shift matrix is a 7×7 matrix that has entries that are all zero except for a diagonal row of ones starting at the first entry of the fourth column and ending at the fourth entry of the seventh column. By virtue of being multiplied by the shift matrix, the shifted depth vector has zeroes as its first 3 entries and the 4 entries of the second depth vector as its following 4 entries. As with the modified identity matrix, because the depth vectors are padded with zeros rather than garbage values, the shift matrix may instead have other values than 0 for entries that are only multiplied by the padded entries of the second depth vector during the multiplication.

In part (b) of the computation, the integrated circuit adds the first depth vector and the shifted second depth vector, i.e., by moving the shifted second depth vector into the output while the first depth vector is in the output, to generate a concatenated depth vector that has the entries of the first depth vector as its first 3 entries and the entries of the second depth vector as its last 4 entries.

The integrated circuit can perform the example computation for each spatial location in the input tensors to generate a respective concatenated depth vector for each spatial location.

Figure 8:
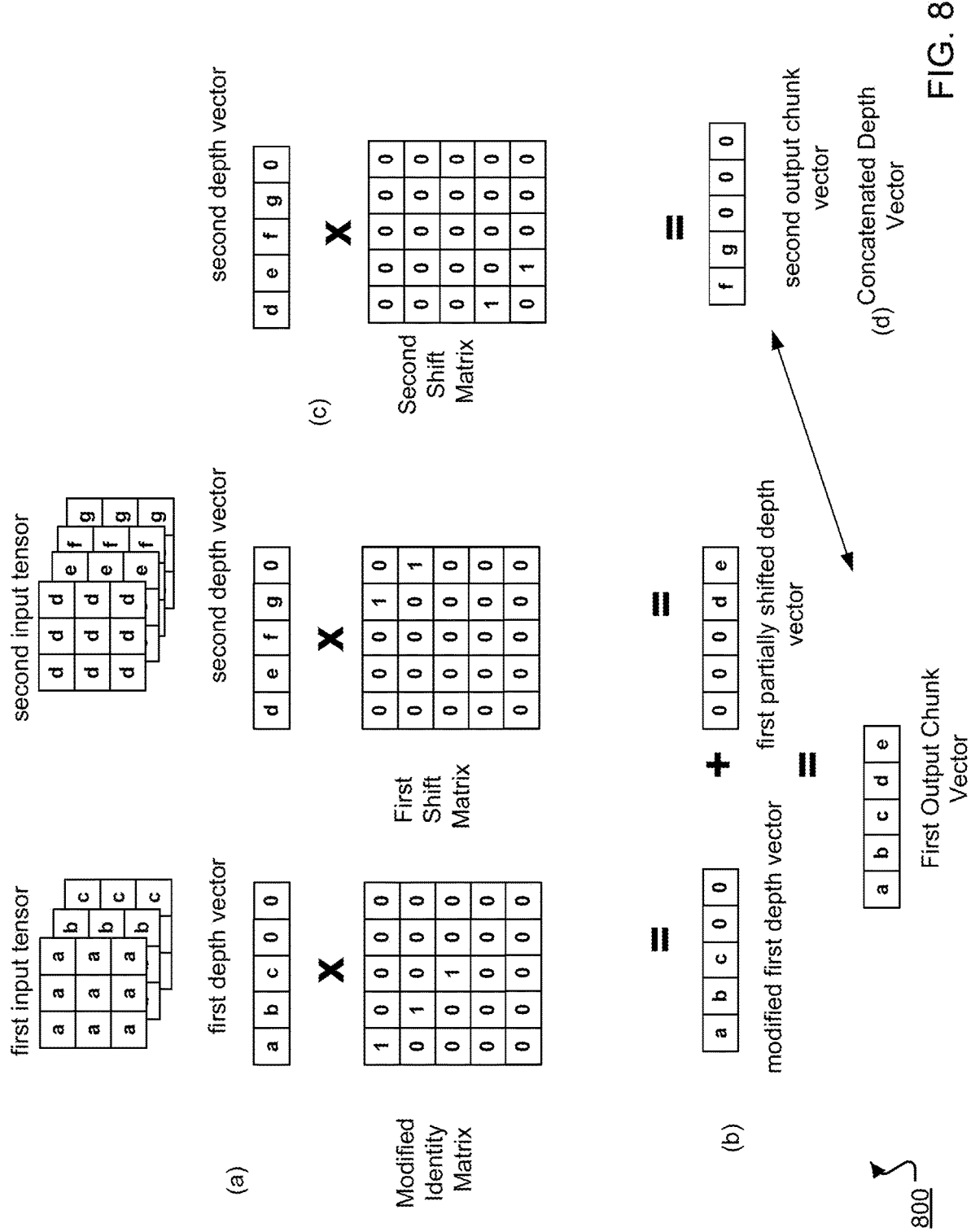
FIG. 8 shows an example of a depth concatenation computation that requires two shift matrices.

FIG. 8 shows an example of a depth concatenation computation 800 that requires two shift matrices.

In the simplified example of FIG. 8, a first input tensor that has dimensions 3×3×3 is to be depth concatenated with a second input tensor that has dimensions 3×3×4 to generate a 3×3×7 output tensor, but the maximum vector length that can be processed in one pass by the matrix computation unit is 5, so that the depth of the depth concatenated output tensor is greater than the maximum vector length.

In parts (a) and (c) of the computation, the integrated circuit operates on a first depth vector from the first input tensor and two instances of a corresponding second depth vector from the second input tensor. In particular, the first depth vector has as its first 3 entries the 3 entries at a given spatial location in the first input tensor and zeroes as its remaining entries, while the second depth vector has as its first 4 entries the 4 entries at the given spatial location in the second input tensor and a zero as its remaining entry. In the example of FIG. 8, the first depth vector and the second depth vector have been padded with zeroes, but in other examples some or all of the depth vectors can instead be padded with garbage data.

To perform part (a) of the computation, the integrated circuit multiplies the first depth vector by a modified identity weight matrix using the matrix computation unit to generate another instance of the first depth vector in the output of the matrix computation unit, i.e., to move the first depth vector to the output.

The integrated circuit then multiplies the second depth vector by a first shift matrix to generate a first partially shifted depth vector. The first shift matrix is a 5×5 matrix that has entries that are all zero except for a diagonal row of ones starting at the first entry of the fourth column and ending at the second entry of the fifth column. By virtue of being multiplied by the shift matrix, the first partially shifted depth vector has zeroes as its first 3 entries and the first 2 entries of the second depth vector as the following 2 entries.

To perform part (b) of the computation, the integrated circuit then adds the first depth vector and the first partially shifted depth vector, i.e., by moving the first partially shifted depth vector into the output while the first depth vector is in the output, to generate the first chunk of the output depth vector that has as its first 3 entries the entries of the first depth vector and as its last 2 entries the first 2 entries of the second depth vector.

To perform part (c) of the computation, i.e., to generate the second chunk of the output depth vector, the integrated circuit multiplies the second depth vector by a second shift matrix to generate a second partially shifted depth vector. The second shift matrix is a 5×5 matrix that has entries that are all zero except for a diagonal row of ones starting at the fourth entry of the first column and ending at the fifth entry of the second column. By virtue of being multiplied by the shift matrix, the second partially shifted depth vector has the last two entries of the second depth vector as its first two entries and zeroes as the remaining entries.

To perform part (d) of the computation, the integrated circuit stores the first chunk vector and the second chunk vector as a representation of the concatenated depth vector for the spatial location, e.g., by storing the two vectors in predetermined locations in the unified buffer that are identified in the instructions as locations where the two vectors that represent the concatenated depth vector for the spatial location are to be stored.

The integrated circuit can perform the example computation for each spatial location in the input tensors to generate a respective concatenated depth vector for each spatial location.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special-purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special-purpose logic circuitry, e.g., an FPGA or an ASIC, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special-purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving a request to process network inputs to a neural network using an integrated circuit that performs neural network computations in hardware using a matrix computation unit, the neural network comprising a depth concatenation neural network layer that specifies a concatenation of two input tensors along a depth dimension, wherein the two input tensors each (i) have a plurality of dimensions that includes the depth dimension and (ii) have the same number of values along all of the plurality of dimensions that are not the depth dimension; and
generating instructions that, when executed by the integrated circuit, cause the integrated circuit to, during processing of a network input by the neural network, generate a layer output tensor that satisfies the specification of the depth concatenation neural network layer by performing operations comprising:
for each spatial location in a first input tensor to the depth concatenation layer and a second input tensor to the depth concatenation layer, wherein the first input tensor has $z_1$ values along the depth dimension and the second input tensor has $z_2$ values along the depth dimension, and wherein each spatial location is a combination of coordinates that includes a respective coordinate for each of the plurality of dimensions that are not the depth dimension:
multiplying, using the matrix computation unit, a second depth vector for the spatial location in the second input tensor by a shift weight matrix for the depth concatenation layer to generate a shifted second depth vector, the shift weight matrix being a $(z_1+z_2)$ by $(z_1+z_2)$ matrix, wherein the second depth vector for the spatial location includes as its first $z_2$ entries the first $z_2$ entries in the second input tensor that have the combination of coordinates for the spatial location and as its remaining $z_1$ entries zeroes or garbage data, and wherein the shifted second depth vector has zeroes as its first $z_1$ entries and entries of the second depth vector as its remaining $z_2$ entries; and
adding the shifted second depth vector and a first input depth vector for the spatial location in the first input tensor to generate a concatenated depth vector, the first input depth vector having as its first $z_1$ entries the first $z_1$ entries in the first input tensor that have the combination of coordinates for the spatial location and as its remaining $z_2$ entries zeroes or garbage data.

2. The method of claim 1, the operations further comprising:
moving the first input depth vector to a set of output sum-in registers of the matrix computation unit; and
wherein adding the shifted second depth vector and the first input depth vector comprises:
moving the shifted second depth vector into the set of output sum-in registers of the matrix computation unit while the first input depth vector is stored in the set of output sum-in registers of the matrix computation unit.

3. The method of claim 2, wherein moving the first input depth vector comprises:
multiplying the first input depth vector by a modified identity weight matrix for the depth concatenation layer using the matrix computation unit.

4. The method of claim 3, further comprising:
generating the modified identity weight matrix for the depth concatenation layer; and
storing the modified identity weight matrix for the depth concatenation layer in a memory accessible to the integrated circuit.

5. The method of claim 1, further comprising:
generating the shift weight matrix for the depth concatenation layer; and
storing the shift weight matrix for the depth concatenation layer in a memory accessible to the integrated circuit.

6. The method of claim 5, further comprising:
determining that the number of entries along the depth dimension in the output tensor does not exceed a maximum vector length for the matrix computation unit; and
generating the shift weight matrix for the depth concatenation layer in response to determining that the number of depth dimensions in the output tensor does not exceed the maximum vector length for the matrix computation unit.

7. The method of claim 1, wherein the shift weight matrix for the depth concatenation layer is a matrix having all entries be zero except for a diagonal row of ones starting at the first entry of the $z_2$-th column of the matrix.

8. A system comprising one or more computers and one or more storage devices storing first instructions that when executed by the one or more computers cause the one or more computers to perform first operations comprising:
receiving a request to process network inputs to a neural network using an integrated circuit that performs neural network computations in hardware using a matrix computation unit, the neural network comprising a depth concatenation neural network layer that specifies a concatenation of two input tensors along a depth dimension, wherein the two input tensors each (i) have a plurality of dimensions that includes the depth dimension and (ii) have the same number of values along all of the plurality of dimensions that are not the depth dimension; and generating second instructions that, when executed by the integrated circuit, cause the integrated circuit to, during processing of a network input by the neural network, generate a layer output tensor that satisfies the specification of the depth concatenation neural network layer by performing second operations comprising:

for each spatial location in a first input tensor to the depth concatenation layer and a second input tensor to the depth concatenation layer, wherein the first input tensor has $z_1$ values along the depth dimension and the second input tensor has $z_2$ values along the depth dimension, and wherein each spatial location is a combination of coordinates that includes a respective coordinate for each of the plurality of dimensions that are not the depth dimension:

multiplying, using the matrix computation unit, a second depth vector for the spatial location in the second input tensor by a shift weight matrix for the depth concatenation layer to generate a shifted second depth vector, the shift weight matrix being a $(z_1+z_2)$ by $(z_1+z_2)$ matrix, wherein the second depth vector for the spatial location includes as its first $z_2$ entries the first $z_2$ entries in the second input tensor that have the combination of coordinates for the spatial location and as its remaining $z_1$ entries zeroes or garbage data, and wherein the shifted second depth vector has zeroes as its the first $z_1$ entries and entries of the second depth vector as the its remaining last $z_2$ entries; and adding the shifted second depth vector and a first input depth vector for the spatial location in the first input tensor to generate a concatenated depth vector, the first input depth vector having as its first $z_1$ entries the first $z_1$ entries in the first input tensor that have the combination of coordinates for the spatial location and as its remaining $z_2$ entries zeroes or garbage data.

9. The system of claim 8, the second operations further comprising:

moving the first input depth vector to a set of output sum-in registers of the matrix computation unit; and wherein adding the shifted second depth vector and the first input depth vector comprises:

moving the shifted second depth vector into the set of output sum-in registers of the matrix computation unit while the first input depth vector is stored in the set of output sum-in registers of the matrix computation unit.

10. The system of claim 9, wherein moving the first input depth vector comprises:

multiplying the first input depth vector by a modified identity weight matrix for the depth concatenation layer using the matrix computation unit.

11. The system of claim 10, the first operations further comprising:

generating the modified identity weight matrix for the depth concatenation layer; and storing the modified identity weight matrix for the depth concatenation layer in a memory accessible to the integrated circuit.

12. The system of claim 8, the first operations further comprising:

generating the shift weight matrix for the depth concatenation layer; and storing the shift weight matrix for the depth concatenation layer in a memory accessible to the integrated circuit.

13. The system of claim 12, the first operations further comprising:

determining that the number of entries along the depth dimension in the output tensor does not exceed a maximum vector length for the matrix computation unit; and generating the shift weight matrix for the depth concatenation layer in response to determining that the number of depth dimensions in the output tensor does not exceed the maximum vector length for the matrix computation unit.

14. The system of claim 8, wherein the shift weight matrix for the depth concatenation layer is a matrix having all entries be zero except for a diagonal row of ones starting at the first entry of the $z_2$-th column of the matrix.

15. One or more non-transitory computer-readable storage media encoded with first instructions that when executed by one or more computers cause the one or more computers to perform first operations comprising:

receiving a request to process network inputs to a neural network using an integrated circuit that performs neural network computations in hardware using a matrix computation unit, the neural network comprising a depth concatenation neural network layer that specifies a concatenation of two input tensors along a depth dimension, wherein the two input tensors each (i) have a plurality of dimensions that includes the depth dimension and (ii) have the same number of values along all of the plurality of dimensions that are not the depth dimension; and generating second instructions that, when executed by the integrated circuit, cause the integrated circuit to, during processing of a network input by the neural network, generate a layer output tensor that satisfies the specification of the depth concatenation neural network layer by performing second operations comprising:

for each spatial location in a first input tensor to the depth concatenation layer and a second input tensor to the depth concatenation layer, wherein the first input tensor has $z_1$ values along the depth dimension and the second input tensor has $z_2$ values along the depth dimension, and wherein each spatial location is a combination of coordinates that includes a respective coordinate for each of the plurality of dimensions that are not the depth dimension:

multiplying, using the matrix computation unit, a second depth vector for the spatial location in the second input tensor by a shift weight matrix for the depth concatenation layer to generate a shifted second depth vector, the shift weight matrix being a $(z_1+z_2)$ by $(z_1+z_2)$ matrix, wherein the second depth vector for the spatial location includes as its first $z_2$ entries the first $z_2$ entries in the second input tensor that have the combination of coordinates for the spatial location and as its remaining $z_1$ entries zeroes or garbage data, and wherein the shifted second depth vector has zeroes as the its first $z_1$ entries and entries of the second depth vector as its remaining $z_2$ entries; and adding the shifted second depth vector and a first input depth vector for the spatial location in the first input tensor to generate a concatenated depth vector, the first input depth vector having as its first $z_1$ entries the first $z_1$ entries in the first input tensor that have the combination of coordinates for the spatial location and as its remaining $z_2$ entries zeroes or garbage data.

16. The computer storage media of claim 15, the second operations further comprising:
moving the first input depth vector to a set of output sum-in registers of the matrix computation unit; and
wherein adding the shifted second depth vector and the first input depth vector comprises:
moving the shifted second depth vector into the set of output sum-in registers of the matrix computation unit while the first input depth vector is stored in the set of output sum-in registers of the matrix computation unit.

17. The computer storage media of claim 16, wherein moving the first input depth vector comprises:
multiplying the first input depth vector by a modified identity weight matrix for the depth concatenation layer using the matrix computation unit.

18. The computer storage media of claim 17, the first operations further comprising:
generating the modified identity weight matrix for the depth concatenation layer; and
storing the modified identity weight matrix for the depth concatenation layer in a memory accessible to the integrated circuit.

19. The computer storage media of claim 15, the first operations further comprising:
generating the shift weight matrix for the depth concatenation layer; and
storing the shift weight matrix for the depth concatenation layer in a memory accessible to the integrated circuit.

20. The computer storage media of claim 15, wherein the shift weight matrix for the depth concatenation layer is a matrix having all entries be zero except for a diagonal row of ones starting at the first entry of the $z_2$-th column of the matrix.

* * * * *